United States Patent [19]
Watanabe et al.

[11] Patent Number: 4,787,649
[45] Date of Patent: Nov. 29, 1988

[54] VEHICLE SUSPENSION SYSTEM

[75] Inventors: Kenichi Watanabe, Hiroshima; Shin Takehara, Higashi-Hiroshima; Hiroo Shimoe; Haruyuki Taniguchi, both of Hiroshima, all of Japan

[73] Assignee: Mazda Motor Corporation, Hiroshima, Japan

[21] Appl. No.: 81,720

[22] Filed: Aug. 4, 1987

[30] Foreign Application Priority Data

Aug. 5, 1986 [JP] Japan .................. 61-183753
Aug. 5, 1986 [JP] Japan .................. 61-183755

[51] Int. Cl.$^4$ ............................................. B60G 17/08
[52] U.S. Cl. ............................................. 280/707
[58] Field of Search ................................. 280/707

[56] References Cited

U.S. PATENT DOCUMENTS 4,600,215 7/1986 Kuroki et al. .................. 280/707
4,667,978 5/1987 Asami et al. .................. 280/707

FOREIGN PATENT DOCUMENTS 0027869 5/1981 European Pat. Off. .
0114757 8/1984 European Pat. Off. .
0151421 8/1985 European Pat. Off. .
0162449 11/1985 European Pat. Off. .
0162448 11/1985 European Pat. Off. .
2401037 3/1979 France .
5914365 4/1984 Japan .

Primary Examiner—Kenneth R. Rice
Attorney, Agent, or Firm—Fleit, Jacobson, Cohn & Price

[57] ABSTRACT

The suspension system of the present invention comprises support means installed between a wheel and the vehicle body exerting suspension force which can be changed irrespective of relative displacement between the wheel and the vehicle body. According to low frequency components of a parameter which respresents changing condition of the relative displacement, the support means is controlled to exert a suspension force in such a way that the relative displacement can be suppressed. Such parameters include the relative displacement and the rate of the change thereof.

According to the present invention, suspension characteristics can be maintained to maintain riding qualities and rolling and pitching properties in a preferable condition throughout all running conditions.

16 Claims, 17 Drawing Sheets

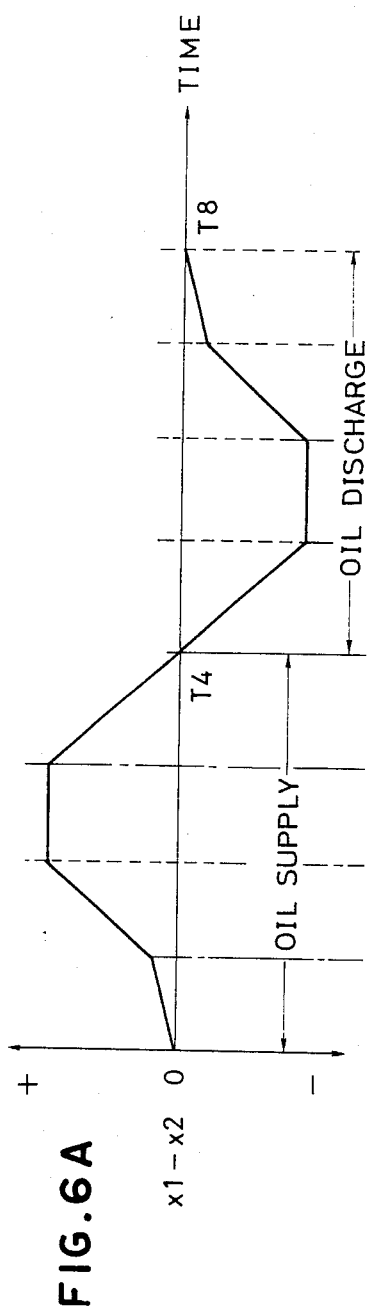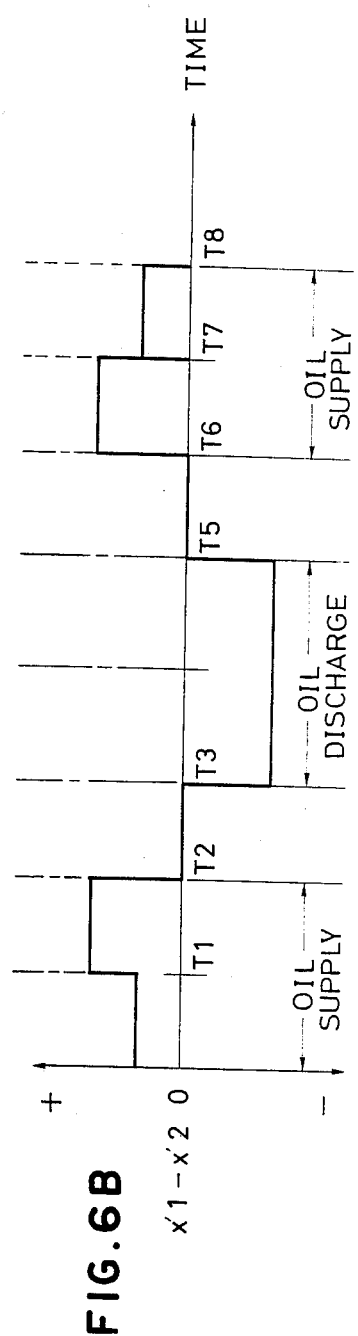

VEHICLE SUSPENSION SYSTEM

BACKGROUND OF THE INVENTION

1. Field of the Invention

The present invention relates to a vehicle suspension system and, in particular, to an active vehicle suspension system. More specifically, the present invention pertains to an active vehicle suspension system which provides improved ride qualities as well as improved rolling and pitching characteristics.

2. Description of Prior Art

Typical prior art vehicle suspension systems comprise a suspension spring and a damper. This type of suspension exerts suspension forces in response to external force acting thereon. Thus, the suspension has a specified spring constant and damping characteristics to thereby perform a desired oscillation under application of external force. It is known that the ride qualities of the suspension can be improved by reducing the spring and damping forces, whereas the rolling and pitching can be improved by increasing these forces. Therefore, proposals have been made to change the suspension characteristics according to driving conditions. For example, the suspension characteristics can be shifted to the hard side by increasing the spring and damping forces during cornering in order to reduce rolling of the vehicle body. However, where the curved road is rough, the suspension set to hard results in bad ride qualities. Thus, this type of suspension is limited in its ability to maintain both good ride qualities and good rolling and pitching properties.

Different types of suspensions have been proposed which comprise a suspension force exerting mechanism such as a hydraulic cylinder between the wheel and the vehicle body. These suspensions can exert different suspension forces irrespective of external forces acting thereon and are therefore called active suspensions. This type of suspension is, for example, disclosed in EPC application No. 0114757 wherein a hydraulic cylinder is provided between a wheel and a vehicle body and is controllably supplied with oil to thereby exert desired suspension forces and thus realize a preferable spring constant and preferable damping properties of the suspension. However, no suggestion is found in this patent about utilizing the active suspension to maintain both the ride qualities and the rolling and pitching properties in a preferable state throughout all types of running condition. An active suspension is also disclosed in Japanese patent publication No. 59-14365, wherein the active susupension is utilized to adjust the height of the vehicle body from the ground to a desired value, but not to improve the ride qualities and rolling and pitching properties of the suspension. Accordingly, a need still exists for improving both the ride qualities and rolling and pitching properties of a vehicle suspension system throughout all running conditions.

SUMMARY OF THE INVENTION

It is therefore an object of the present invention to provide an improved vehicle suspension system which can exert desired suspension forces irrespective of external forces applied thereto.

Another object of the present invention is to provide an active suspension system which produces desired ride qualities as well as desired rolling and pitching properties under any running conditions.

Still another object of the present invention is to provide an active suspension system in which the suspension characteristics are controlled based on a parameter representing the changing condition of the distance between a wheel and a vehicle body, whereby both riding qualities and rolling and pitching properties are maintained in a desirable condition.

The present invention is based on the recognition that suspension characteristics can be maintained to maintain ride qualities, rolling and pitching properties in a preferable condition if the suspension force is controlled according to a parameter representing the changing condition of the relative distance between a wheel and a vehicle body. Such parameters include the amount of the relative displacement between the wheel and the vehicle body, and the rate of change therein.

According to the present invention, there is provided a vehicle suspension system which comprises a support means disposed between a wheel and a vehicle body exerting suspension force which can be changed irrespective of any relative displacement between the wheel and the vehicle body. A sensing means is provided for sensing one of the parameters representing changing condition of the relative displacement between the wheel and the vehicle body, namely the relative displacement itself or the rate of the change in the relative displacement. The suspension force exerted by the support means is modified under control of a control means. The control means is supplied with a signal from the sensing means and extracts low frequency components therefrom. According to the low frequency components, the control means controls the support means to exert the suspension force in such a way that the relative displacement can be suppressed.

In a preferred embodiment, the support means consists of a hydraulic actuator having a hydraulic cylinder, an oil pump and a pressure regulating valve disposed therebetween. As is known to those skilled in the art, a vehicle suspension system can be regarded to be equivalent to a simplified model as shown in FIG. 1. Namely, the oscillation system of the suspension is regarded as that comprising a lower side mass m1 and an upper side mass m2 with respect to a coil spring means having a spring constant of Kk. A damper is also disposed between the masses m1 and m2, whose oscillation-damping property is Kc. The wheel possesses a spring constant of Ko. Furthermore, absolute positions of the lower mass m1, the upper mass m2 and the road surface are X1, X2, and Xo, the positive direction of which is upward. These two mass systems possess two resonance points, whose frequencies f1 and f2 are defined as follows:

$$f1 \text{ of the lower mass} = \frac{1}{2\pi} \sqrt{\frac{Ko + Kk}{m1}}$$

$$f2 \text{ of the upper mass} = \frac{1}{2\pi} \sqrt{\frac{Kk}{m2}}$$

In a suspension system of a usual automobile, f1 of the lower side mass m1 is about 10 Hz and f2 of the upper side mass m2 is about 1 Hz.

Referring to this suspension model, the support means in a preferred embodiment of the invention is controlled by the control means to exert the suspension force as defined by the following formula.

$$U = K(x1-x2) + Kc(X'1-X'2) + Kk(X1-X2)$$

where
- K: factor for modifying the suspension force, whose value is positive,
- X1−X2: relative displacement between the wheel and the vehicle body, which is detected by the sensing means,
- x1−x2: low frequency components of X1−X2,
- X'1−X'2: a differential of X1−X2.

In a preferred embodiment, a low frequency f is set to one that is equal to or near the resonance frequency f2 of the upper mass m2 so that the low frequency components below the frequency f are extracted from X1−X2. The product of K and x1−x2 is utilized to modify the suspension force $Uo(= Kc(X'1-X'2) + Kk(X1-X2))$.

In another aspect of the present invention, there is provided a vehicle suspension system wherein the rate of change in the relative displacement between the wheel and the vehicle body is utilized to modify the suspension force. This suspension system comprises a support means installed between a wheel and the vehicle body exerting suspension force which can be changed irrespective of relative displacement between the wheel and the vehicle body. A sensing means is provided for sensing the relative displacement between the wheel and the vehicle body. The suspension force exerted by the support means is changed under control of a control means. The control means is supplied with a signal from the sensing means, calculates the rate of change in the displacement from it, and extracts low frequency components from the calculated rate. According to the low frequency components, the control means controls the support means to exert the suspension force in such a way that the rate of change in the relative displacement can be suppressed. In a preferred embodiment, the low frequency components are those below a specific frequency f which is equal to or near the frequency f2 of the upper mass m2 (refer to FIG. 1).

Other objects and advantages of the present invention will become apparent upon reading the following detailed descriptions with reference to the attached drawings.

BRIEF DESCRIPTION OF THE DRAWINGS

FIG. 6A illustrates an example of the change in the low frequency components x1−x2 with respect to time;

FIG. 6B illustrates an example of the change in x'1−x'2 with respect to time;

DESCRIPTION OF THE PREFERRED EMBODIMENT

While the present invention will be described in connection with preferred embodiments, it will be understood that we do not intend to limit the invention to these embodiments. On the contrary, we intend to cover all alternatives, modifications, and equivalents as may be included within the spirit and scope of the invention as defined by the attached claims.

Figure 2:
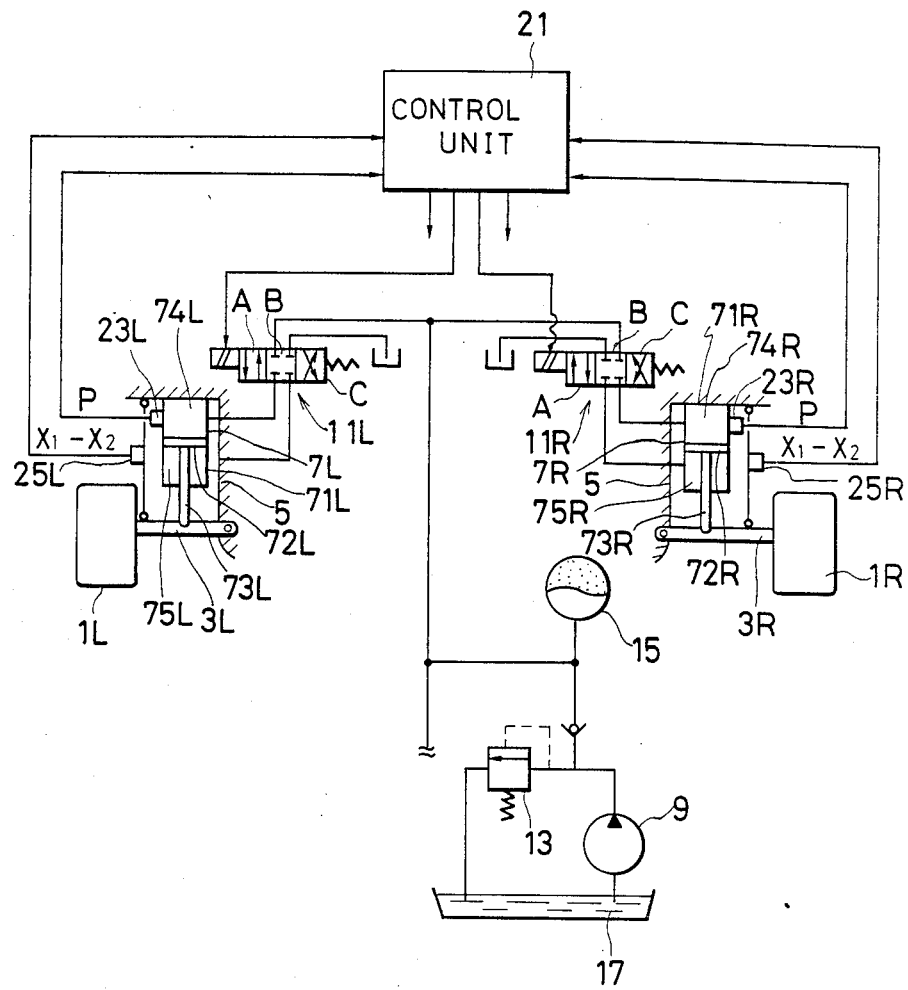
FIG. 2 shows a general construction of an embodiment of the present invention, wherein X1−X2 is use to modify the suspension force.

Referring now to the drawings, especially to FIG. 2, there is schematically illustrated an embodiment according to the invention. As shown in FIG. 2, both front wheels 1L and 1R are supported by a vehicle body 5 via suspension arms 3L and 3R. The suspension arms 3L and 3R are pivotally connected to the vehicle body 5 so that the wheels are swingable in the longitudinal direction with respect to the vehicle body 5. The suspension arrangement applied for each wheel is similar, and therefore in the following only the left side suspension for the left wheel will be explained. The suspension system of the embodiment is of the active type and, as a means for exerting suspension force irrespective of the displacement between the wheel and the vehicle body, there is provided a power cylinder unit 7L along the longitudinal direction of the vehicle body between the wheel 1L and the body 5. The cylinder unit 7L comprises a cylinder 71L having an upper end connected to the body 5 and a piston 72L slidably inserted into the cylinder. The piston has a piston rod 73L connected thereto which extends downward and is connected at its lower end to the suspension arm 3L. The power cylinder unit 7L is controllably applied with hydraulic oil to exert different amounts of suspension forces.

The hydraulic system for the actuator 7L consists mainly of an oil reservor 17, an oil pump 9 and a control valve 11L disposed in a hydraulic line connecting the pump 9 and the actuator 7L. The valve 11L is of a magnetically operated type. When the valve is set to a block A, hydraulic oil is supplied to an upper oil chamber 74L of the cylinder 71L to thereby push the piston 72L downward. Whereas, when it is set to a block B, the actuator 7L is isolated from the hydraulic lines and the piston halts. When the valve is set to a block C, hydraulic oil is supplied to a lower oil chamber 75L of the cylinder 71L to thereby push the piston 72L upward. In the hydraulic system, there are also provided a release valve 13 and accumulator 15 for maintaining the oil pressure in the system above a specific value.

Figure 4:
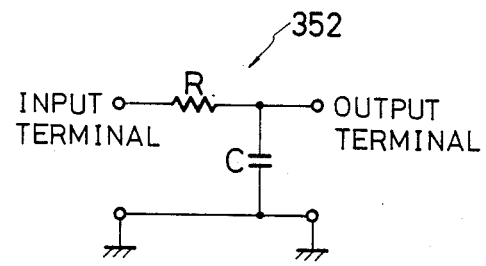
FIG. 4 shows an example of circuits of the low pass filter in FIG. 3.
Figure 3:
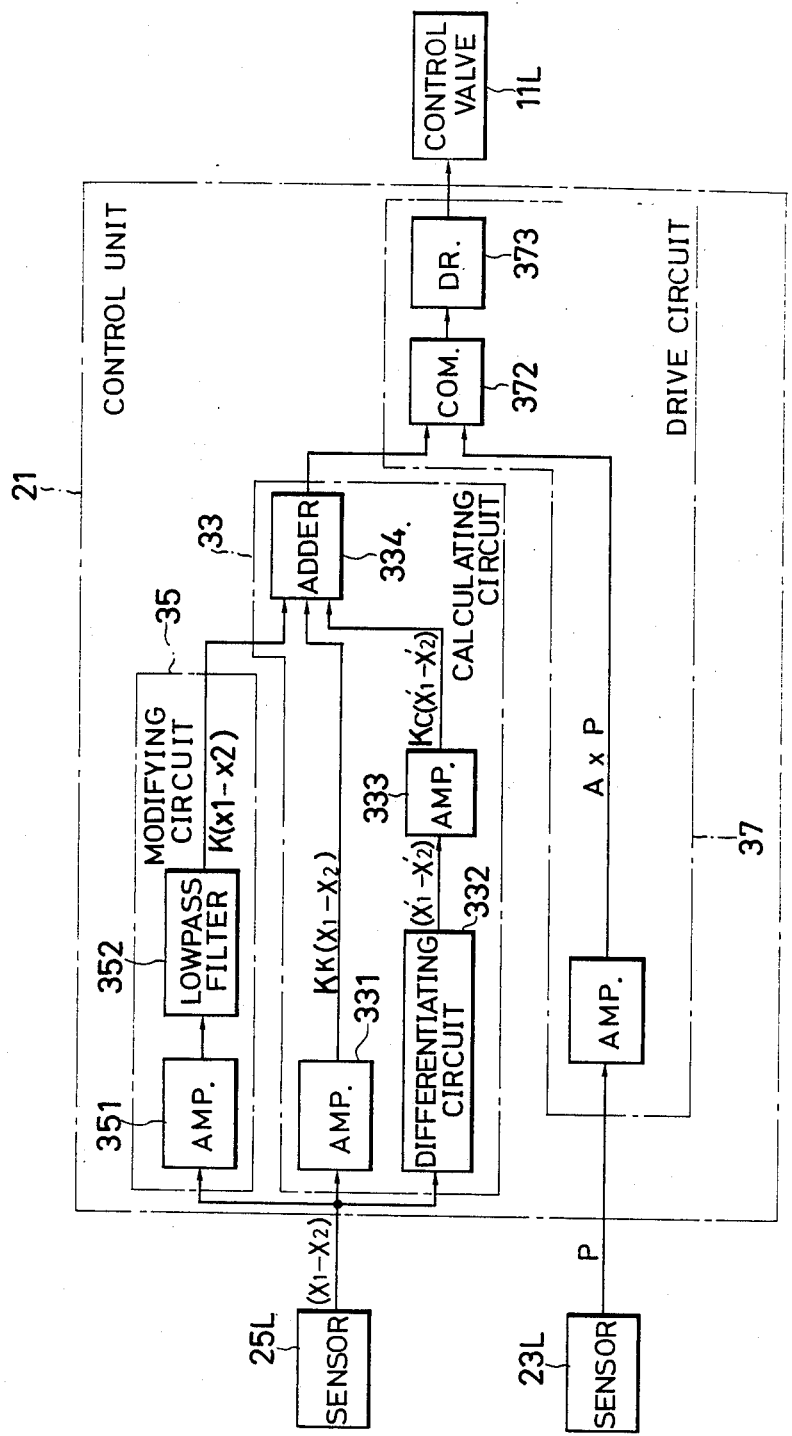
FIG. 3 shows a block diagram of the control unit of the syspension system as shown in FIG. 2.

Referring to FIGS. 2 to 4, a control system for the control valve 11L will be explained. The system includes main elements of a control circuit 21 and two sensors 23L and 25L electrically connected to the input port of the control circuit. The sensor 23L is disposed in the chamber 74L to detect the oil pressure P therein. The other sensor 25L is installed between the wheel and the body to detect the relative displacement $X1-X2$ between the wheel and the body. The control circuit 21 calculates the suspension force exerted from the actuator 7L and controls the actuator so that it exerts the calculated force. A detailed explanation on this control will be made hereinafter.

A block diagram of the control circuit 21 is shown in FIG. 3. The control circuit 21 consists of a calculating circuit 33, modifying circuit 35 and drive circuit 37. The calculating circuit 33 calculates the suspension force Uo so as to oscillate the suspension system according to the predetermined oscillation characteristics. Namely, the output $(X1-X2)$ of the sensor 25L is supplied to a amplifier 331 in which it is multiplied by a predetermined constant Kk to produce $Kk(X1-X2)$. The output $(X1-X2)$ is also supplied to a differentiating circuit 332 to be differentiated to thereby produce a differential $(X'1-X'2)$. The produced $(X'1-X'2)$ is passed through an amplifier 333 to be amplified by Kc. The resulting value of $Kc(X'1-X'2)$ and the above value of $(X1-X2)$ are added in an adder 334 to obtain the suspension force Uo as defined by the following formula.

$$Uo = Kk(X1-X2) + Kc(X'1-X'2)$$

Figure 1:
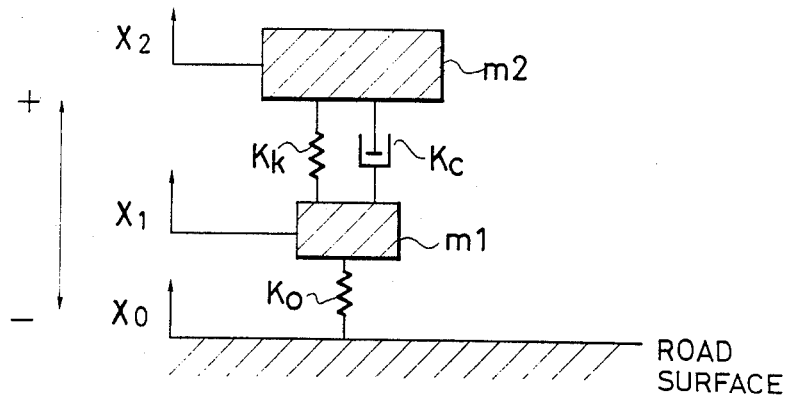
FIG. 1 illustrates an oscillation system representing that of a vehicle suspension system.

The obtained Uo is modified by the modifying circuit 35 in accordance with the detected relative displacement $X1-X2$. This circuit 35 includes an amplifier 351 which amplifies the supplied output $(X1-X2)$ by K to produce $K(X1-X2)$. $K(X1-X2)$ is then supplied to a lowpass filter 352, through which low frequency components $K(x1-x2)$ are extracted from the $K(X1-X2)$. In the embodiment, the lowpass filter 352 passes therethrough only low frequency components below a specific frequency f which is near the resonance frequency f2 of the upper mass m2 as shown in FIG. 1. The obtained value of $K(x1-x2)$ is then applied to the adder 334, in which it is added with the suspension force Uo to modify it. Thus, the suspension force is modified as follows:

$$U = K(x1-x2) + Kk(X1-X2) + Kc(X'1-X'2)$$

The drive circuit 37 controls the actual suspension force so as to make it equal to the calculated force U in the form of a closed-loop mode. The drive circuit 37 reads the output P of the sensor 23L through an amplifier 371, whereby the actual suspension force AP is obtained (A is the net area of the cylinder). The actual force AP is supplied to a comparator 372, in which it is compared with the calculated force U. The output of the comparator is supplied to a driver 373 which in turn drives the control valve 11L according to the output. Where U>AP, the valve is set to block A so that the hydraulic oil is applied to the upper chamber 74L. Hence, the actual suspension force is increased. Where U<AP, the valve is set to the block C so that the oil is discharged from the upper chamber 74L, while it is supplied to the lower chamber 75L. Hence, the actual suspension force is decreased. When U=AP, the actual suspension force is maintained at the current value by setting the valve to the block B to halt the oil flow.

FIG. 4 shows an example of the lowpass filter 352, which consists of a resistance R and a capacitor C. As is known, the characteristics of this type of filter are determined by the time constant of R and C as follows:

$$RC = \tfrac{1}{2}\pi fo$$

Figure 5:
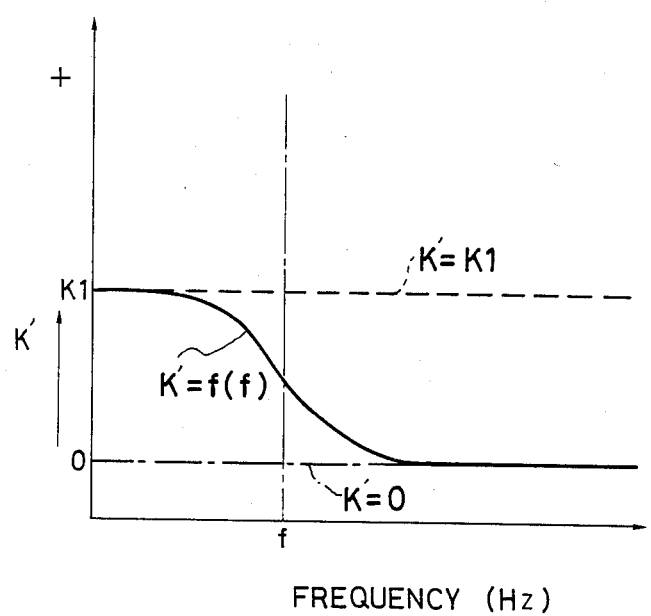
FIG. 5 illustrates a characteristic of the low pass filter shown in FIG. 4.

By applying f as fo, a desired filter can be formed for passing only low frequency components below f2 therethrough. The curve $K = f(f)$ shown in FIG. 5 expresses the characteristics of the lowpass filter 352 in the embodiment.

The operation of the suspension system now will be described. Referring first to FIG. 6A, the movement of the actuator 7L is illustrated. Where the low frequency components $x1-x2$ of the relative displacement $X1-X2$ are changed in the positive direction, that is, the wheel and the body move toward each other (from 0 to T1), the actuator 7L is supplied in the chamber 74L with hydraulic oil so that it is driven to expand the distance between the wheel and the body, whereby the oscillation of the suspension system is suppressed. Likewise, where the wheel and the body move apart from each other, and $x1-x2$ changes in the negative direction (from T4 to T8), the actuator 7L discharges hydraulic oil from the chamber 74L so that it is driven to reduce the distance between the wheel and the body, and the oscillation is suppressed. With this operation, the present suspension system exhibits the oscillating characteristics shown by the curves B and E in FIGS. 7 and 8, respectively.

Figure 7:
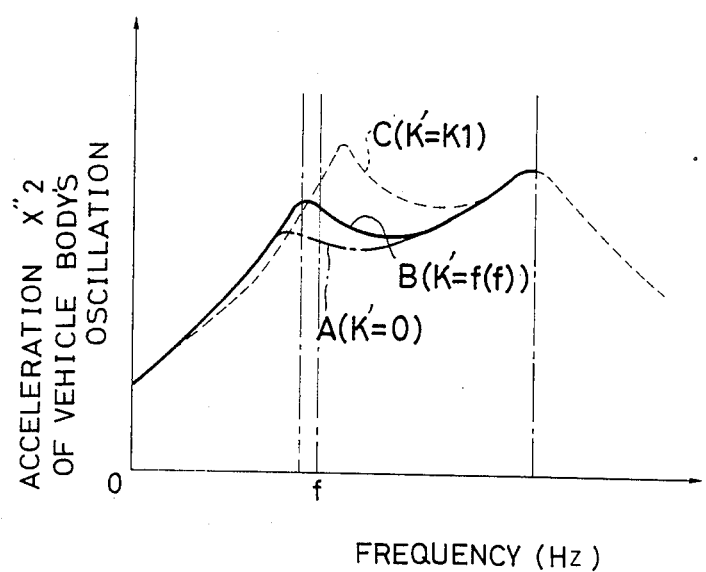
FIG. 7 shows curves of acceleration X"2 of the vehicle body's oscillation with respect to frequency.

In FIG. 7, there are illustrated curves A to C of acceleration $X''2$ of the vehicle body's oscillation in the longitudinal direction. The acceleration $X''21$ relates to the riding comfort of the vehicle. The lower the value of $X''2$ becomes, the more improved the riding comfort will be. By comparing the curve B with the other two curves A and C, the suspension system of the present invention can provide good riding comfort throughout the whole frequency range or all running conditions. The curve A is obtained where K' is set to zero, while the curve C is obtained where K' is set to a constant, positive value of K1.

Figure 8:
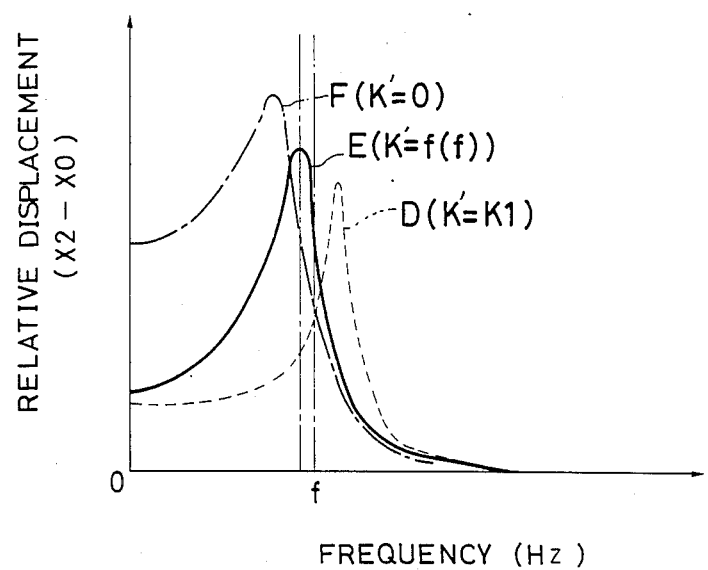
FIG. 8 shows curves of the relative displacement X2−X0 with respect to frequency.

On the other hand, in FIG. 8, there are shown curves D to F of the the relative displacement $X2-X0$. This displacement relates to rolling and pitching properties of the vehicle, and these properties are improved as the value of $X2-X0$ is decreased. Taking into account the curves shown in FIGS. 7 and 8, it is understood that, according to the embodiment, the riding comfort and rolling and pitching properties are maintained in a better condition throughout the entire frequency range in comparison with those obtained by setting K' to either zero or K1 throughout the whole frequency range. Namely, where K' is set to zero, the rolling and pitching properties are bad in the low frequency range below f as shown by the curve F in FIG. 8, and where it is set to K1, the riding comfort is bad in the high frequency range above f as shown by the curve C in FIG. 7.

Figure 9:
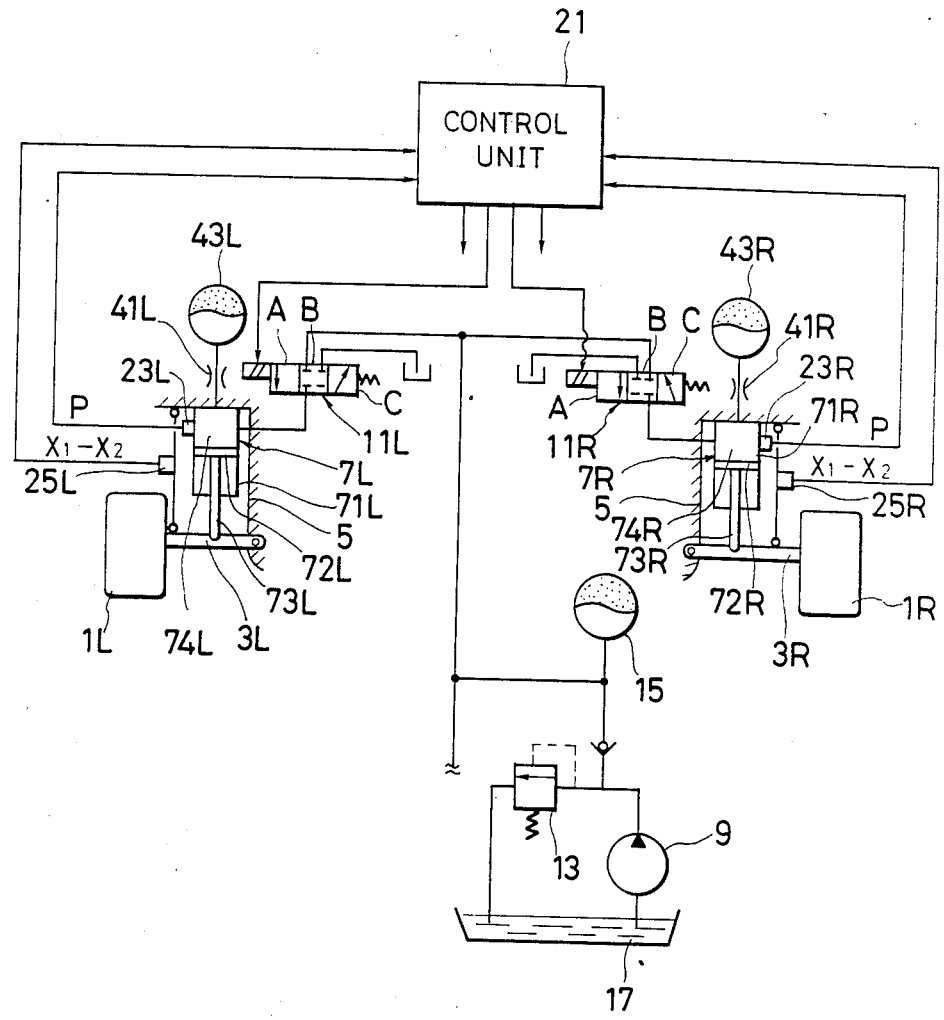
FIG. 9 illustrates a general construction of another embodiment of the present invention which includes air springs.
Figure 10:
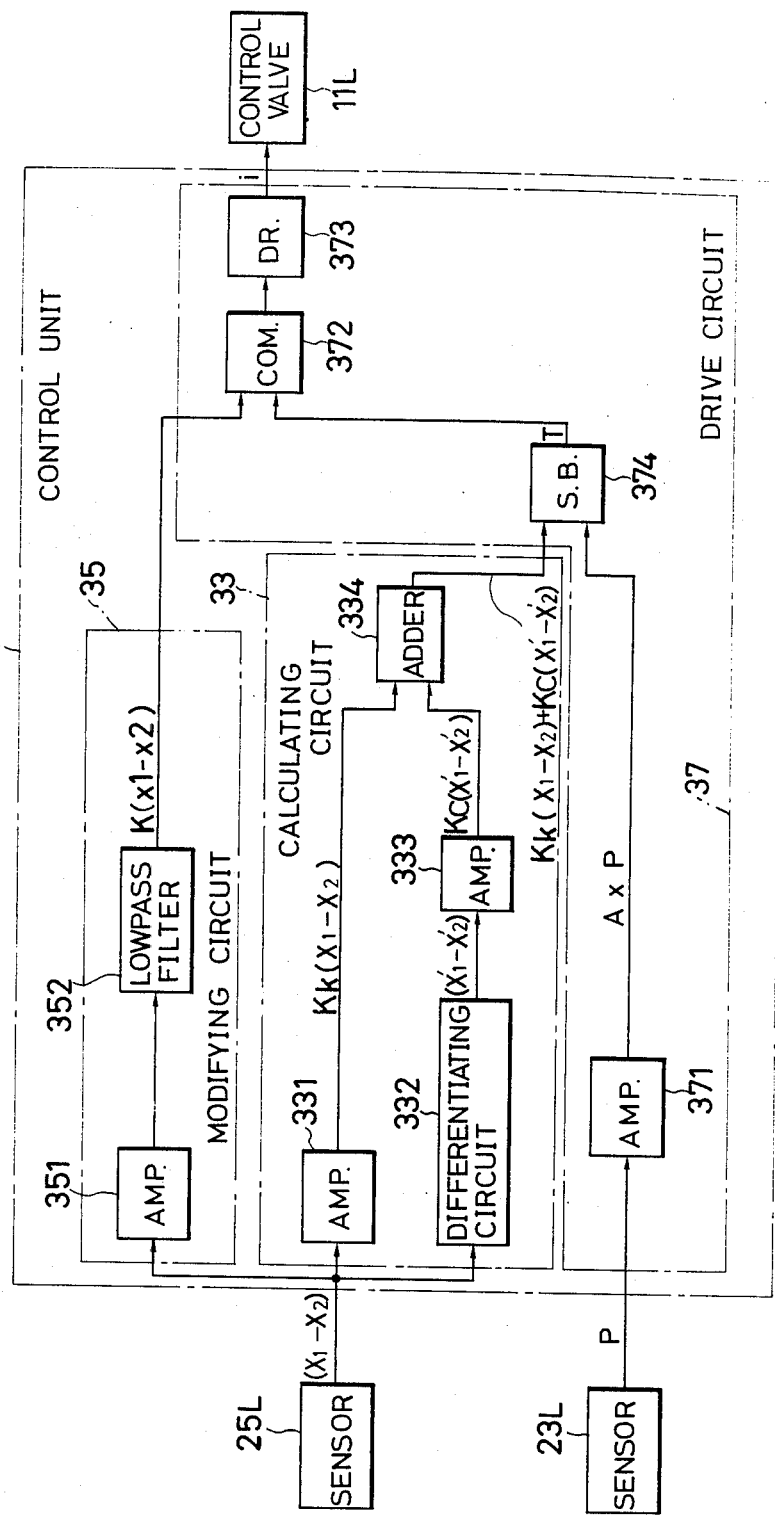
FIG. 10 is a block diagram of the control unit in the syspension system as shown in FIG. 9.

Referring to FIGS. 9 and 10, another example of the suspension system according to the present invention will be described. This suspension system is similar to the suspension system described above except that it includes air spring means for defining a spring constant of the suspension oscillation system. Therefore, in the drawings, the elements of this suspension system that are the same as those of the previous embodiment are denoted by the same numerals as in FIGS. 2 and 3.

As shown in the drawings, the suspension system includes a power cylinder unit 7L which has an air spring 43L communicated with a chamber 74L via an orifice 41L. The air spring 43L defines a spring constant Kk of the suspension oscillation system and restriction of the orifice 41L defines an oscillation-damping constant Kc thereof. Hydraulic oil is supplied only to a chamber 74L and a control valve 11L is modified for this control. A control unit 21 for controlling the valve 11L is also modified as shown in FIG. 10. Namely, the drive circuit 37 includes a subtracter 374 in which the following subtraction is made.

$$T = AP - (Kk(X1-X2) + Kc(X'1-X'2))$$

The obtained value T is then supplied from the subtracter 374 to the comparator 372 in which it is compared with the value $K(x1-x2)$ calculated in the modifying circuit 35. The output representing the result of the comparison is supplied to the driver 373 which in turn controls the control valve 11L. When $K(x1-x2) > T$, the control valve 11L is driven to supply the hydraulic oil to the chamber 74L, while when $K(x1-x2) < T$, it is driven to discharge the hydraulic oil from the chamber 74L. Whereas, when $K(X1-X2) = T$, the control valve is driven to halt the oil flow. According to the embodiment, advantages and effects similar to the previous emmbodiment can be obtained.

Figure 11:
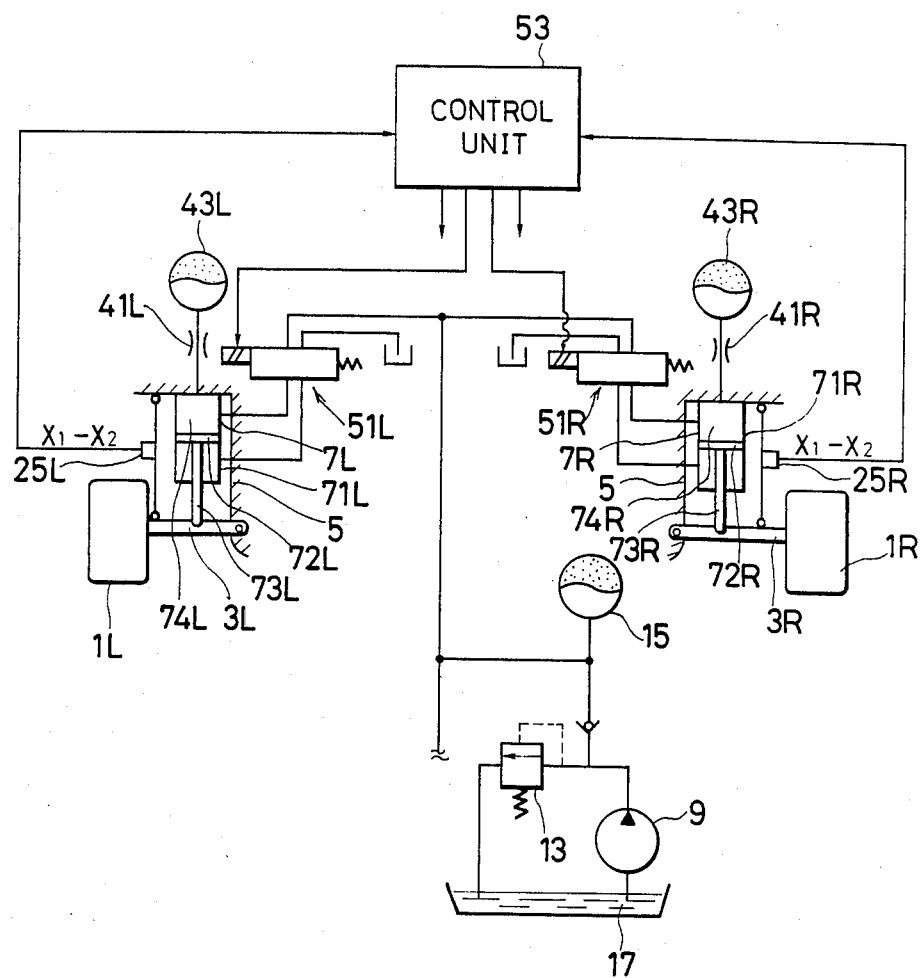
FIG. 11 illustrates a genaral construction of another embodiment of the present invention which includes flow control valves.
Figure 12:
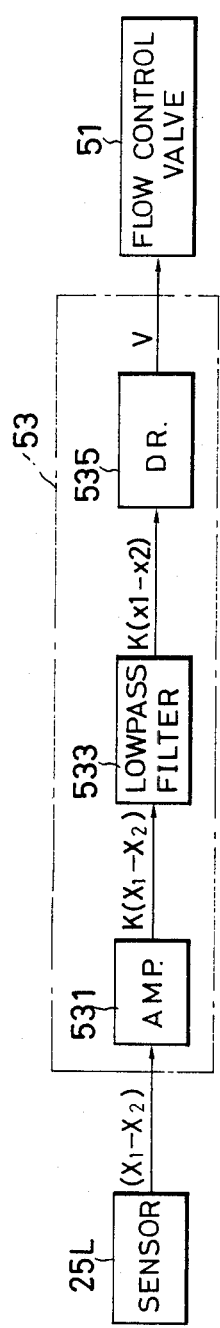
FIG. 12 shows a block diagram of the control unit of the suspension system shown in FIG. 11.
Figure 13:
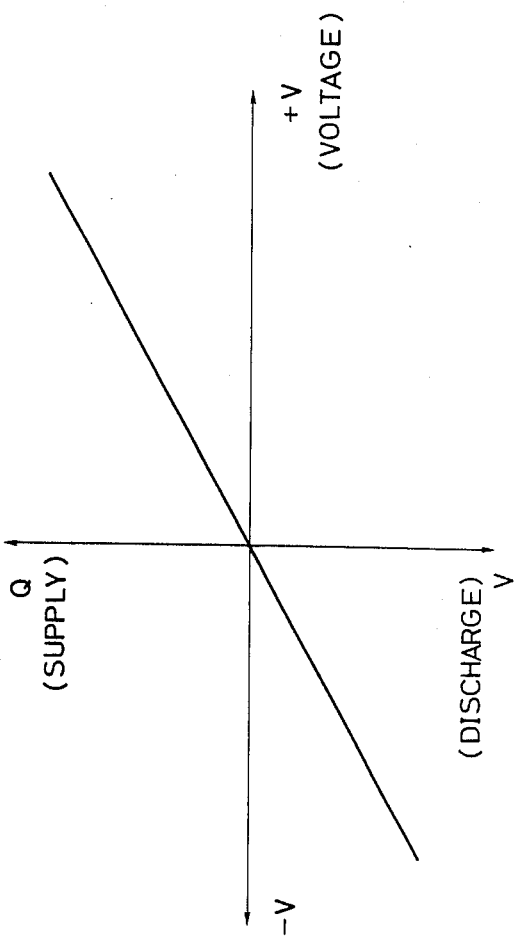
FIG. 13 shows a relationship between voltage and the amount of the hydraulic oil supplied or discharged through the flow control valve shown in FIG. 12.

In the above two embodiments, the actual suspension force is detected by the pressure sensor and is controlled to become equal to the calculated force in the form of a closed-loop mode. Alternatively, a flow control valve can be used which controls the amount of oil supplied to the hydraulic actuator 7 in response to the voltage applied thereon. By utilizing this type of control valve, the actual suspension force can be controlled in the form of an open-loop. FIGS. 11 and 12 show an embodiment in which the actual suspension force is controlled in an open-loop by controlling a flow control valve. As shown in FIG. 11, the suspension system of this embodiment has a construction similar to those of the previous embodiments except for the following elements. A flow control valve 51 is provided instead of the control valve 11 and the pressure sensor 23 is deleted. A control unit 53 for the flow control valve 51 is illustrated in FIG. 12. The control unit 53 includes an amplifier 531 in which the detected relative displacement $X1-X2$ is amplified by K to produce $K(X1-X2)$. The low frequency components of $K(x1-x2)$ are extracted from $K(X1-X2)$ by a low pass filter 533 and are supplied to a driver 535 for the flow control valve 51. The driver 535 produces a voltage, the value of which is proportional to the value of $K(x1-x2)$. The flow control valve 51 controls the flow supplied to or discharged from the cylinder chamber 74L according to the applied voltage as shown in FIG. 13. According to this embodiment, the similar advantages and effects can also be obtained.

In the above three embodiments, the relative displacement $X1-X2$ between the wheel and the body is utilized as a parameter representing the changing condition of the distance between the wheel and the body. Alternatively, the rate of change in the displacement therebetween can also be utilized to improve the riding confort and the rolling and pitching properties throughout all running conditions.

Figure 14:
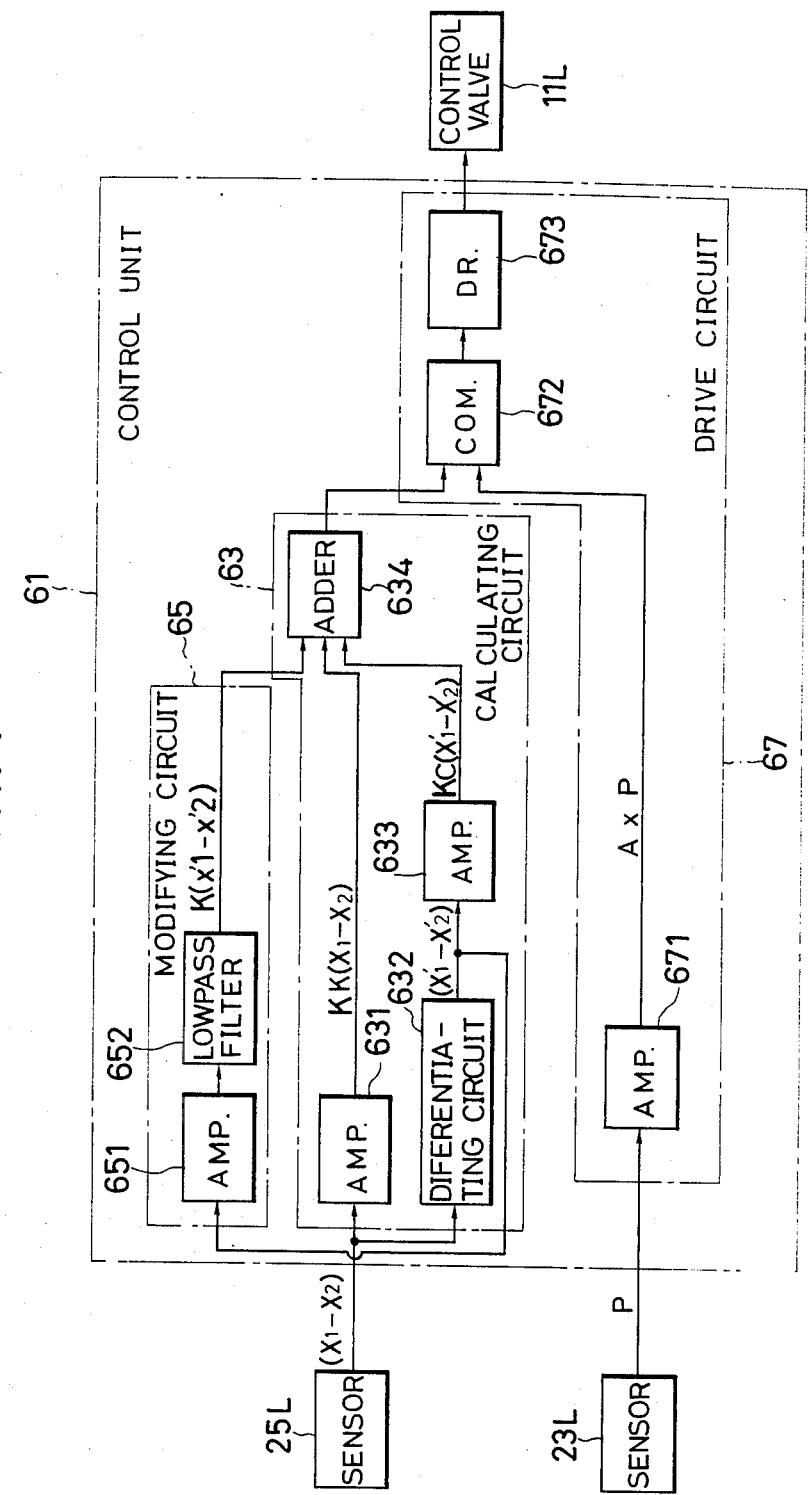
FIG. 14 is a block diagram of the control unit applicable for the present invention's suspension system, wherein X'1−X'2 is used as a parameter representing the changing condition of the distance between the wheel and the vehicle body.

FIG. 14 shows an example of the control unit of this type. A suspension mechanism can be the same as in FIG. 2 and the control valve 11 is driven under the control of the control unit 61. The control unit 61 comprises a calculating circuit 63, a modifying circuit 65 and a drive circuit 67. The calculating circuit 63 is supplied with the detected displacement $X1-X2$ from the sensor 25L and calculates $Kk(X1-X2)$ and $Kc(X'1-X'2)$. The differential $(X'1-X'2)$ of $X1-X2$ is supplied to an amplifier 651 of the modifying circuit 65, in which it is amplified by K and is then supplied to a low pass filter 652. The low frequency components $K(x'1-x'2)$ of $K(X'1-X'2)$ only pass through the filter 652 and are supplied to an adder 634 in the calculating circuit 63. The adder 634 adds the sum of $Kk(X1-X2)$ and $Kc(X'1-X'2)$ with $K(x'1-x'2)$. Namely, the calculated suspension force Uo is modified by $K(x'1-x'2)$ as follows:

$$U = K(x'1-x'2) + Kk(X1-X2) + Kc(X'1-X'2)$$

The drive circuit 67 includes a comparator 672 in which the actual suspension force AP is compared with the modified suspension force U. A signal in response to the result of the comparison is applied to a driver 673 which generates a drive signal according to the result. The control valve 11L is supplied with the drive signal so that it controls the hydraulic actuator 11L in such a way that the rate of change in the displacement between the wheel and the body is suppressed. FIG. 6B shows an example of the operation performed by the control unit. As is shown, when the value of $x'1-x'2$ is positive (0-T2, T6-T8), the suspension force is modified to increase according to the value of $x'1-x'2$, whereas when it is negative (T3-T5), the suspension force is decreased according to the value of $x'1-x'2$.

Figure 15:
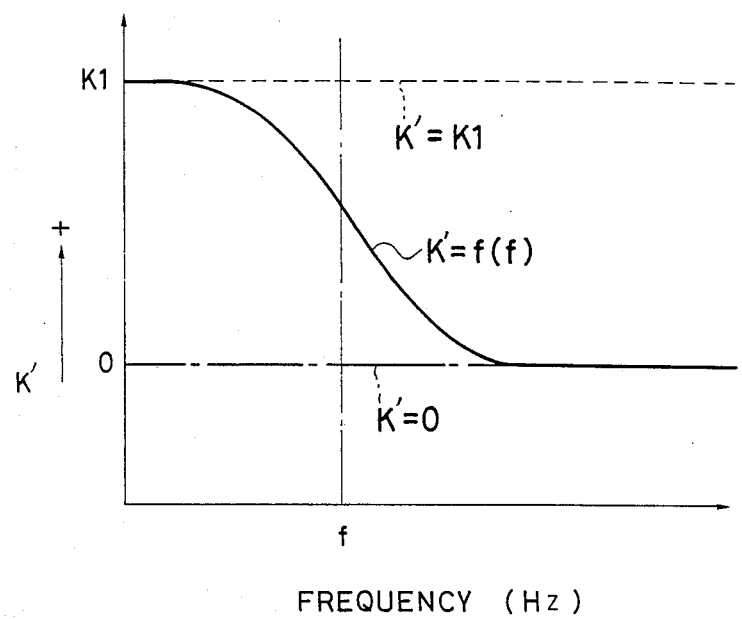
FIG. 15 shows a characteristic curve of the low pass filter shown in FIG. 14.

The low pass filter 652 can be formed by using a resistance R and a capacitor C as shown in FIG. 4. In the present embodiment, the low pass filter has a characteristcs as shown by curve $K'=f(f)$ in FIG. 15 and therefore can pass therethrough the low frequency components of $x'1-x'2$ below the frequency f. This frequency f can be equal to or near the resonance frequency f2 of the upper mass m2 (refer to FIG. 1).

Figure 16:
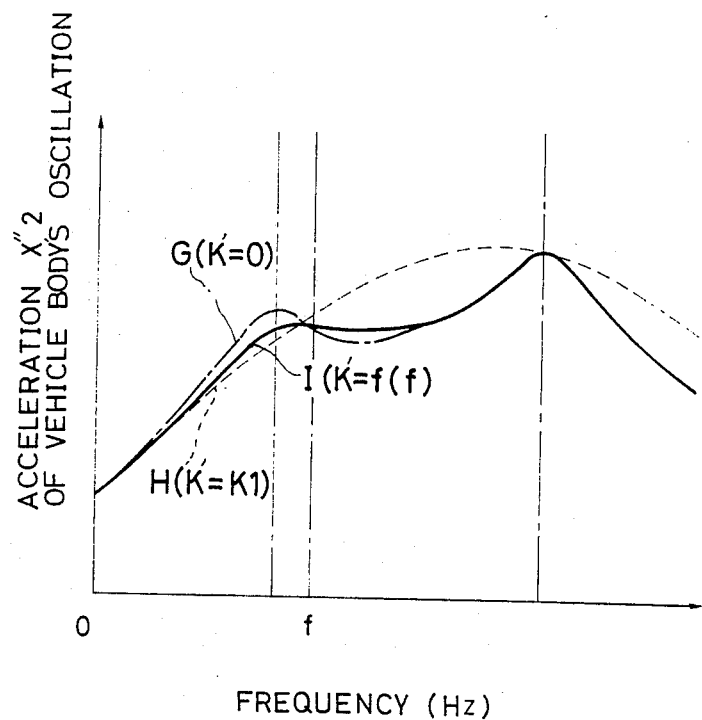
FIG. 16 shows curves of acceleration X"2 of the vehicle body's oscillation with respect to frequency.

In FIG. 16, there are illustrated curves G to I of acceleration $X''2$ of the vehicle body's oscillation in the longitudinal direction. The acceleration $X''2$ relates to the riding comfort of the vehicle. The lower the value of $X''2$ becomes, the more improved the riding comfort will be. The curve G is obtained where K' is set to zero, while the curve H is obtained where K' is set to a constant, positive value of K1.

Figure 17:
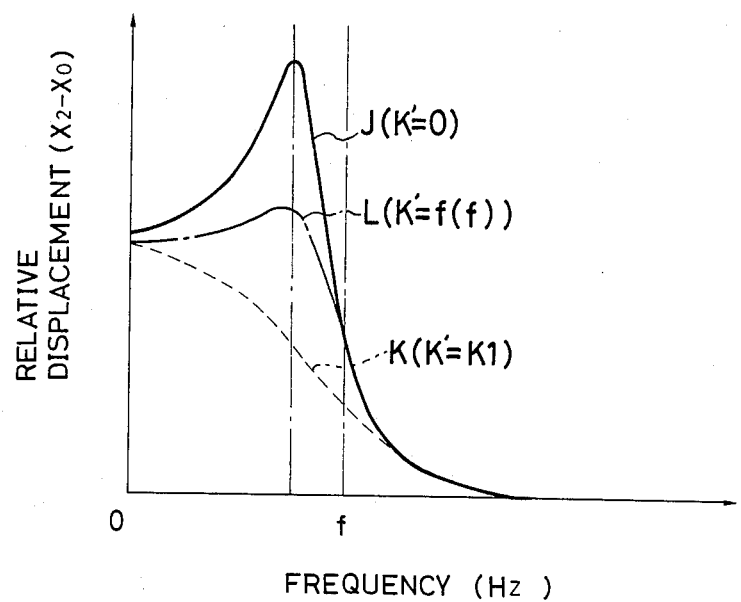
FIG. 17 shows curves of the relative displacement between the wheel and the vehicle body with respect to frequency.

On the other hand, in FIG. 17, there are shown curves J to L of the the relative displacement $X2-X0$. This displacement relates to rolling and pitching properties of the vehicle, and these properties are improved as the value of $X2-X0$ is decreased. Taking into account the curves shown in FIGS. 16 and 17, it is understood that, according to the embodiment, the riding comfort and rolling and pitching properties are maintained in better condition throughout the entire frequency range in comparison with those obtained by setting K' to either zero or K1 throughout the whole frequency range. Namely, where K' is set to zero, the rolling and pitching properties are bad in the low frequency range below f as shown by the curve J in FIG. 17, and where it is set to K1, the riding comfort is bad in the high frequency range above f as shown by the curve H in FIG. 16.

Figure 18:
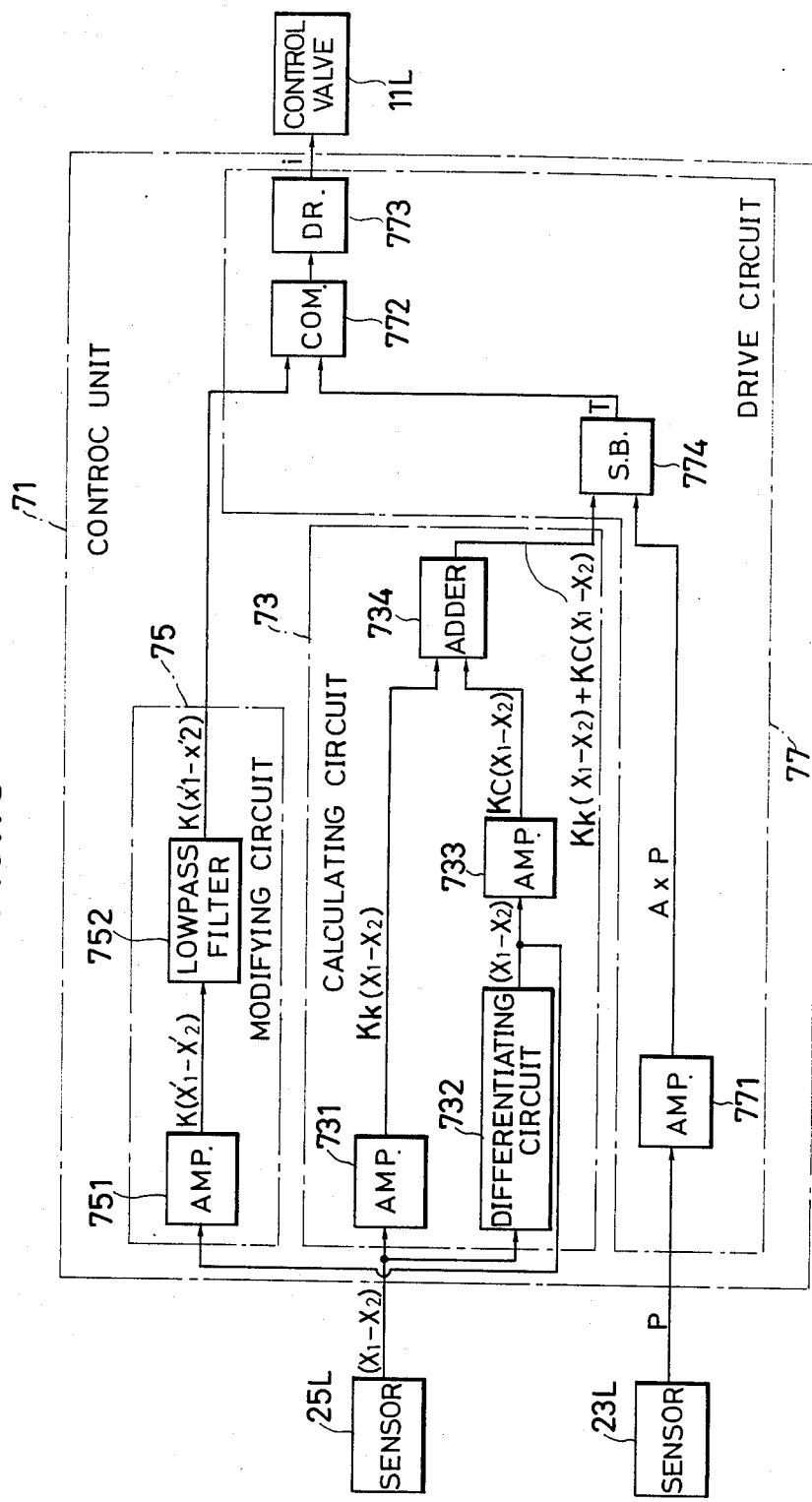
FIG. 18 is a block diagram of the control unit which is applicable for the system of the present invention, wherein X'1−X'2 is used to modify the suspension force.
Figure 19:
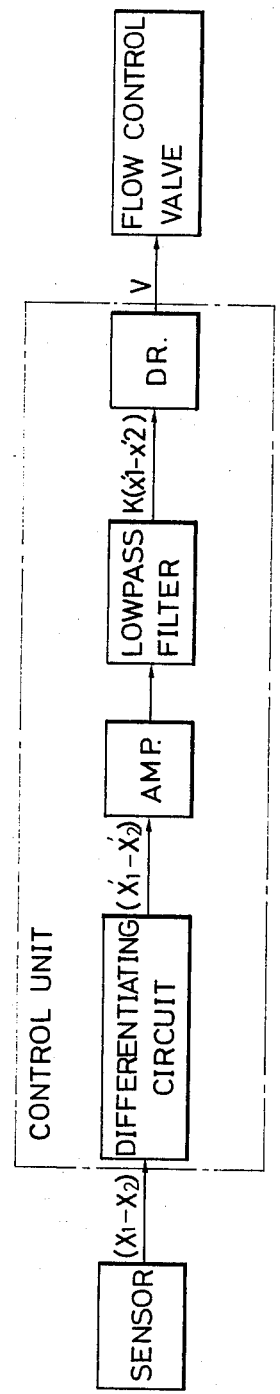
FIG. 19 shows another type of the control unit applicable for the present suspension system which includes a flow control valve.

In FIG. 18, there is illustrated an example of the control unit which can be applied for control of the suspension system of the type as shown in FIG. 9. This control unit 71 includes a calculating circuit 73, modifying circuit 75 and drive circuit 77. A differential X′1−X′2 of X1−X2 is calculated in a differentiator 732 is supplied to the modifying circuit 75, in which a modifying force K (x′1−x′2) is obtained.

Where the suspension system having a folw control valve as shown in FIG. 11 is applied and X′1−X′2 is used for controlling the suspension force, a control unit as shown in FIG. 19 can be utilized. This control unit is similar to that shown in FIG. 12 except that it includes a differentiator for calculating a differential X′1−X′2 of X1−X2. In addition, both controls performed by the control circuits as shown in FIGS. 12 and 19 can easily be combined to obtain both of K(x1−x2) and K(x′1−x′2). The sum of these values can be used as a parameter for controlling the flow control valve, which is apparent to those skilled in the art.

We claim:

1. A vehicle suspension system for plural vehicle wheels comprising support means disposed between each wheel and a vehicle body exerting suspension force which can be changed irrespective of relative displacement between the wheel and the vehicle body, a separate sensing means for each wheel for detecting one of the parameters representing changing condition of the relative displacement between the wheel and the vehicle body, control means for controlling the respective support means when supplied with a signal from the respective sensing means, by extracting low frequency components therefrom and, according these components, controlling the support means to exert the suspension force in such a way that said relative displacement can be suppressed, wherein each support means includes a fluid actuator having a fluid cylinder disposed between the respective wheel and the vehicle body, the system further including a fluid reservoir, pumping means for supplying pressurized fluid from the reservoir to the respective fluid cylinders, and a separate valve means interposed between the pump means and the respective cylinders for controlling fluid flow applied to and discharged from the respective cylinders, and wherein said control means controls each of said valve means so that pressurized fluid is applied to and discharged from each of said cylinders to exert suspension forces from each fluid actuator according to each of said displacements.

2. The vehicle suspension system as set forth in claim 1, wherein said low frequency components of the relative displacement between the respective wheel and the vehicle body are those below a specific frequency which is equal to or near the resonance frequency of the upper side mass.

3. The vehicle suspension system as set forth in claim 1, wherein said parameter is relative displacement between the respective wheel and the vehicle body.

4. The vehicle suspension system as set forth in claim 1, wherein said parameter is the rate of the change in the relative displacement between the wheel and the vehicle body.

5. The vehicle suspension system as set forth in claim 4, wherein said rate of change is obtained by differentiating the relative displacement which is detected by the sensing means.

6. The vehicle suspension msystem as set forth in claim 1, wherein said control means includes a low pass filter means which passes therethrough low frequency components of the detected relative displacement.

7. The vehicle suspension system as set forth in claim 6, wherein said low pass filter means consists of an analog circuit having a resistance and a capacitor.

8. The vehicle suspension system as set forth in claim 1, wherein each said actuator comprises a hydraulic actuator.

9. The vehicle suspension system as set forth in claim 1, which further comprises pressure sensing means for sensing the pressure in each said actuator.

10. The vehicle suspension system as set forth in claim 9, wherein each said valve means is controlled in a closed-loop by said control means according to the output of said pressure sensing means.

11. The vehicle suspension system as set forth in claim 1, wherein each cylinder defines a fluid chamber communicating with air spring means.

12. The vehicle suspension means as set forth in claim 1, wherein each said valve means is of a change-over type having a first position for supplying fluid to respective actuator, a second position for discharging fluid from said actuator, and a third position for halting the fluid flow.

13. The vehicle suspension system as set forth in claim 1, wherein each said valve means is of a flow control type that controls the amount of fluid passing therethrough according to the value of the driving signal applied thereon.

14. A vehicle suspension system comprising hydraulic actuator means disposed between a wheel and a vehicle body exerting suspension force which can be changed irrespective of any relative displacement between the wheel and the vehicle body, sensing means for detecting relative displacement between the wheel and the vehicle body, control means for controlling the hydraulic actuator means which includes low pass filter means to extract low frequency components from the detected relative displacement by the sensing means and, according to these components, controls the hydraulic actuator means to exert the suspension force in such a way that said relative displacement can be suppressed, said hydraulic actuator means having fluid pumping means and valve means disposed between said actuator and said fluid pumping means.

15. The vehicle suspension system as set forth in claim 14, wherein said hydraulic actuator means includes a fluid chamber and an air spring communicated thereto, and wherein said valve means is a flow control valve which controls the amount of the fluid passing therethrough to and from said fluid chamber according to the value of the detected signal by said sensor means.

16. The vehicle suspension system as set forth in claim 15, wherein said low pass filter means passes only low frequency components of the detected relative displacement below a specific frequency which is equal to or near the resonance frequency of the upper side mass of the suspension system.

* * * * *